(12) United States Patent
Watanabe et al.

(10) Patent No.: US 8,937,789 B2
(45) Date of Patent: Jan. 20, 2015

(54) MICROWAVE ASSISTED MAGNETIC RECORDING HEAD AND MAGNETIC DATA STORAGE APPARATUS

(71) Applicant: Hitachi, Ltd., Tokyo (JP)

(72) Inventors: Katsuro Watanabe, Hitachiota (JP); Masukazu Igarashi, Kawagoe (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 13/912,229

(22) Filed: Jun. 7, 2013

(65) Prior Publication Data
US 2013/0329316 A1    Dec. 12, 2013

(30) Foreign Application Priority Data
Jun. 8, 2012   (JP) ................................. 2012-130764

(51) Int. Cl.
  G11B 5/31    (2006.01)
  G11B 5/147   (2006.01)
  G11B 5/23    (2006.01)
  G11B 5/00    (2006.01)

(52) U.S. Cl.
  CPC .............. G11B 5/147 (2013.01); G11B 5/314 (2013.01); G11B 5/3146 (2013.01); G11B 5/315 (2013.01); G11B 2005/0024 (2013.01)
  USPC ......................... 360/125.3; 360/122; 360/319

(58) Field of Classification Search
  USPC ........................................ 360/122, 125.3, 319
  See application file for complete search history.

(56) References Cited

U.S. PATENT DOCUMENTS

| | | | | |
|---|---|---|---|---|
| 4,563,396 | A * | 1/1986 | Fukuda et al. | 428/457 |
| 5,838,521 | A * | 11/1998 | Ravipati | 360/319 |
| 6,183,893 | B1 * | 2/2001 | Futamoto et al. | 428/831.2 |
| 6,807,031 | B2 * | 10/2004 | Macken et al. | 360/317 |
| 6,954,334 | B2 * | 10/2005 | Wakita et al. | 360/128 |
| 8,320,079 | B2 * | 11/2012 | Iwasaki et al. | 360/128 |
| 8,437,105 | B2 * | 5/2013 | Vas'ko et al. | 360/319 |
| 8,437,106 | B2 * | 5/2013 | Yanagisawa et al. | 360/319 |
| 8,462,467 | B2 * | 6/2013 | Yanagisawa et al. | 360/319 |
| 8,520,338 | B2 * | 8/2013 | Udo et al. | 360/128 |

(Continued)

FOREIGN PATENT DOCUMENTS

| | | |
|---|---|---|
| JP | 6-243527 | 9/1994 |
| JP | 2009-70541 | 4/2009 |
| JP | 2011118958 A * | 6/2011 |
| WO | WO 2011132503 A1 * | 10/2011 |

OTHER PUBLICATIONS

English translation of WO 2011/132503 A1 (Igarashi M et al.) publsihed Oct. 27, 2011.*
Jian-gang (Jimmy) Zhu et al., Microwave Assisted Magnetic Recording (MAMR), The Magnetic Recording Conference (TMRC) 2007 Paper B6 (2007).
Yiming Wang et al., Media damping constant and performance characteristics in microwave assisted magnetic recording with circular ac field, Journal of Applied Physics 105, 07B902 (2009).

*Primary Examiner* — Will J Klimowicz
(74) *Attorney, Agent, or Firm* — Antonelli, Terry, Stout & Kraus, LLP.

(57) ABSTRACT

To suppress a spread of not only a recording magnetic field generated from a main pole but also a high-frequency magnetic field generated from a spin torque oscillator in a microwave assisted magnetic recording head. The main pole and the spin torque oscillator are surrounded by a trailing shield layer and are also surrounded by a side/leading shield layer with an insulator sidegap layer interposed therebetween, and a high-frequency magnetic field shield layer, which absorbs a high-frequency magnetic field generated from the spin torque oscillator, is arranged in at least part of the shield layers.

10 Claims, 11 Drawing Sheets

(56) References Cited

U.S. PATENT DOCUMENTS

| | | |
|---|---|---|
| 8,553,359 B2 * | 10/2013 | Yamada et al. .......... 360/125.02 |
| 8,630,068 B1 * | 1/2014 | Mauri et al. ................. 360/319 |
| 2009/0052095 A1 | 2/2009 | Yamada et al. |
| 2010/0007996 A1 * | 1/2010 | Iwasaki et al. ................ 360/324 |
| 2011/0205667 A1 * | 8/2011 | Yamada et al. ................ 360/122 |
| 2012/0087046 A1 * | 4/2012 | Yanagisawa et al. ......... 360/294 |
| 2013/0279046 A1 * | 10/2013 | IWASAKI et al. ........... 360/244 |

\* cited by examiner

MICROWAVE ASSISTED MAGNETIC RECORDING HEAD AND MAGNETIC DATA STORAGE APPARATUS

CLAIM OF PRIORITY

The present application claims priority from Japanese patent application JP 2012-130764 filed on Jun. 8, 2012, the content of which is hereby incorporated by reference into this application.

BACKGROUND

1. Technical Field

The present invention relates to a microwave assisted magnetic recording head that adopts a microwave assisted magnetic recording scheme, and a hard-disk drive having the head mounted thereon.

2. Background Art

In recent years, the a real density of HDD (hard-disk drive) has been steadily increasing with the adoption of a perpendicular magnetic recording scheme, and is now about to reach 1 Tb/in$^2$. However, it has become increasingly difficult to write data to magnetic disk media in a smaller track width or bit length and read data from magnetic disk media. In particular, with a reduction in the size of a main pole, which generates a recording magnetic field, of a recording head, the intensity of the recording magnetic field would decrease, so that it would become more difficult to record data on magnetic disk media. Although shingled magnetic recording (SMR) in which overwriting is performed while a wide main pole is gradually shifted by an amount of a track pitch is considered to be used for practical applications, it is not considered that the attainable a real density will increase significantly as the thermal stability of magnetic disk media cannot be improved significantly.

As a technology of recording data on a magnetic disk medium with high thermal stability, i.e., with a high anisotropy field, an energy assisted recording technology is drawing attention. This is a technology of weakening the magnetic field intensity needed for magnetization reversal by applying external energy to a magnetic disk medium, and writing a magnetic signal to the medium on which recording has not been able to be performed with a conventional recording scheme, and achieves both an improvement of the write-ability and a reduction in the size of recording areas. As the energy assisted recording technology, there are known a heat assisted recording technology that performs recording using heat generated by laser irradiation, and a microwave assisted magnetic recording technology that performs recording using a high-frequency magnetic field generated by a high-frequency oscillator.

The microwave assisted magnetic recording technology is a novel technology that has been proposed in recent years, and holds promise in that its built-in assist mechanism of a magnetic head, in particular, is less complicated than that of the heat assisted recording technology. Reference 1 discloses a technology of reducing the intensity of a recording magnetic field by irradiating a magnetic disk medium with a high-frequency magnetic field and thus locally reducing the coercivity of the medium through high-frequency induction heating. Non-Patent Documents 1 and 2 each disclose a technology of recording information on a magnetic disk medium with large magnetic anisotropy by applying a high-frequency magnetic field generated from a field generation layer (FGL), in which magnetization rotates at high speed by using the spin transfer torque effect, provided near a main pole of a perpendicular magnetic head. Further, Patent Document 2 discloses a technology of efficiently recording a positive/negative magnetization state on a magnetic disk medium with large magnetic anisotropy by applying a high-frequency magnetic field while changing the rotation direction in accordance with the polarity of a recording magnetic field, which is generated from a spin torque oscillator with a FGL as one of its components provided between a main pole and a trailing shield of a magnetic recording head.

As disclosed in the above documents, the microwave assisted magnetic recording is actively researched and developed as it can be combined with the conventional perpendicular magnetic recording head and thus is expected to be used for practical applications.

PATENT DOCUMENTS

Patent Document 1: JP 6-243527A
Patent Document 2: JP 2009-070541 A

NON-PATENT DOCUMENTS

Non-Patent Document 1: J. G Zhu and X. Zhu, "Microwave Assisted Magnetic Recording", The Magnetic Recording Conference (TMRC) 2007 Paper B6 (2007)
Non-Patent Document 2: Y. Wang et. Al., "Media damping constant and performance characteristics in microwave assisted magnetic recording with circular as field", Journal of Applied Physics, vol. 105, p. 07B902 (2009)

SUMMARY

FIG. 18 is a cross-sectional schematic view, in the stripe height direction including a spin torque oscillator, of a conventional microwave assisted magnetic recording head, and FIG. 19 is a schematic view showing the structure on an air bearing surface 100 thereof. The typical structure of the conventional microwave assisted magnetic recording head includes a spin torque oscillator 40 arranged between a main pole 22 and a trailing shield layer 24 of the magnetic recording head. The main pole 22, the trailing shield layer 24, and an upper magnetic pole 25 are stacked above a read device having as a main component a read sensor 15, which is sandwiched between a lower shield layer 11 and an upper shield layer 12 formed above a substrate 10, with a lower magnetic pole 21 interposed therebetween. A coil 31 is arranged above and below the main pole 22. A high-frequency magnetic field for assist recording is caused to be generated from the spin torque oscillator 40 provided between the main pole 22 and the trailing shield layer 24 that are connected to a current source 50.

The structure of the periphery of the spin torque oscillator 40 will be specifically described using the schematic structural view of the air bearing surface shown in FIG. 19. The trailing shield layer 24, which serves as an electrode, is in contact with the top of the spin torque oscillator 40, and the main pole 22, which is serves as another electrode, is in contact with the bottom of the spin torque oscillator 40. The trailing shield layer 24 and the main pole 22 are electrically insulated in portions other than the portion of the spin torque oscillator 40. A side/leading shield layer 26 is provided around the main pole 22, which is the lower electrode, with a conductive sidegap layer 27 interposed therebetween. The side/leading shield layer 26 has a function of reducing the lead resistance and suppressing a spread of a recording magnetic field from the main pole 22.

The above structure is now compared with the structure of a perpendicular magnetic recording head having no assist mechanism mounted thereon. FIG. 20 is a cross-sectional structural view, in the stripe height direction including a main pole, of a perpendicular magnetic recording head, and FIG. 21 is a schematic view showing the structure on the air bearing surface.

The difference between the microwave assisted magnetic recording head and the perpendicular magnetic recording head seen in their cross-sectional structures lies in the fact that the microwave assisted magnetic recording head has the spin torque oscillator 40 arranged on the air bearing surface 100, while the perpendicular magnetic recording head does not, and that the perpendicular magnetic recording head has a back contact portion 29 arranged between a yoke portion 23 and an upper magnetic pole 25, while the microwave assisted magnetic recording head does not. With regard to the structure of the air bearing surface, the microwave assisted magnetic recording head has the spin torque oscillator 40 arranged between the main pole 22 and the trailing shield layer 24, while in the perpendicular magnetic recording head, the width of a top gap layer 28 between the main pole 22 and the trailing shield layer 24 in the track width direction is narrow, the trailing shield layer 24 is in direct contact with the side/leading shield layer 26, and the periphery of the main pole 22 is entirely surrounded by the shield layers. When such a structure is employed, it becomes possible to suppress an excessive spread of a recording magnetic field generated from the main pole 22.

The microwave assisted magnetic recording head has no portion where the trailing shield layer 24 is in direct contact with the side/leading shield layer 26. Thus, the both sides of the spin torque oscillator 40 are magnetic gaps, and a recording magnetic field from the main pole 22 spreads at the portions, so that wide writing results. In contrast, as shown in FIG. 22, when an insulator sidegap layer 271 is formed as the sidegap layer, it becomes possible to have the trailing shield layer 24 and the side/leading shield layer 26 arranged in direct contact with each other, and the main pole 22 is surrounded by the shield layers. Accordingly, it was found that although an excessive spread of a recording magnetic field from the main pole 22 can be suppressed, a spread of a high-frequency magnetic field cannot be suppressed as described below.

The present invention provides a microwave assisted magnetic recording head that can write narrower or shorter recording bits and read information more stably by suppressing a spread of not only a recording magnetic field generated from a main pole but also a high-frequency magnetic field generated from a spin torque oscillator.

In order to address the newly found fact described above, according to the present invention, a shield layer is made to partially include a high-frequency magnetic field shield layer made of a material that absorbs a high-frequency magnetic field.

That is, the magnetic head of the present invention includes a main pole configured to generate a recording magnetic field for recording information as a magnetic signal on a magnetic disk medium, a spin torque oscillator arranged near the main pole and configured to generate a high-frequency magnetic field for enhancing a precession motion of magnetization of the magnetic disk medium, and a shield layer arranged in a manner surrounding the main pole and the spin torque oscillator. The shield layer partially includes a high-frequency magnetic field shield layer including a material that absorbs the high-frequency magnetic field.

The high-frequency magnetic field shield layer is arranged on track width sides or on a trailing side with respect to the spin torque oscillator. In addition, the high-frequency magnetic field shield layer may be arranged between the spin torque oscillator and the read sensor.

The high-frequency magnetic field shield layer is formed with a hard magnetic material. Alternatively, the high-frequency magnetic field shield layer may be formed with a magnetic layer including soft magnetic material layers stacked with a spacer interposed therebetween, or a multilayer film including soft magnetic material layers stacked with spacers interposed therebetween.

The effective anisotropy field of the high-frequency magnetic field shield layer is preferably higher than the effective anisotropy field of a layer, which receives a high-frequency magnetic field, in the magnetic disk medium.

According to the present invention, it is possible to suppress a spread of not only a recording magnetic field generated from a main pole but also a high-frequency magnetic field generated from a spin torque oscillator in the track width direction or the down-track direction, whereby narrower or shorter bits can be recorded on disk media. That is, a microwave assisted magnetic recording head that is adapted to higher a real density can be provided.

In addition, when a high-frequency magnetic field shield layer is arranged between a spin torque oscillator and a read sensor, it is possible to prevent a high-frequency magnetic field from oscillating magnetization of a longitudinal biasing layer of a read device. Thus, stable operations without fluctuations of the read properties can be performed.

Other problems, configurations, and advantages will become apparent from the following description of embodiments.

DETAILED DESCRIPTION

In order to suppress a spread of a recording magnetic field generated from a main pole, and further suppress a spread of a high-frequency magnetic field generated from a spin torque oscillator in a microwave assisted magnetic recording head, the permeability of magnetic materials applied to a shield layer around a main pole was estimated. The permeability was estimated using the following formula of the real part of complex permeability obtained by solving a Landau-Lifshitz equation of magnetization motion for a thin film:

$$\mu = 4\pi M_s (\omega_0^2 - \omega^2) \omega_0^2 / H_k ((\omega_0^2 - \omega^2)^2 + (4\pi\lambda\omega)^2) \quad (1)$$

Herein, $M_s$ represents the saturation magnetization, $H_k$ represents the anisotropy field, and $\lambda$ represents the of Landau-Lifshitz's damping constant. In addition, $\omega_0$ represents the ferromagnetic resonance frequency and is given by: $\omega_0 = \gamma (4 \pi M_s H_k)^{1/2}$, and $\gamma$ represents the gyro magnetic constant.

Figure 1:
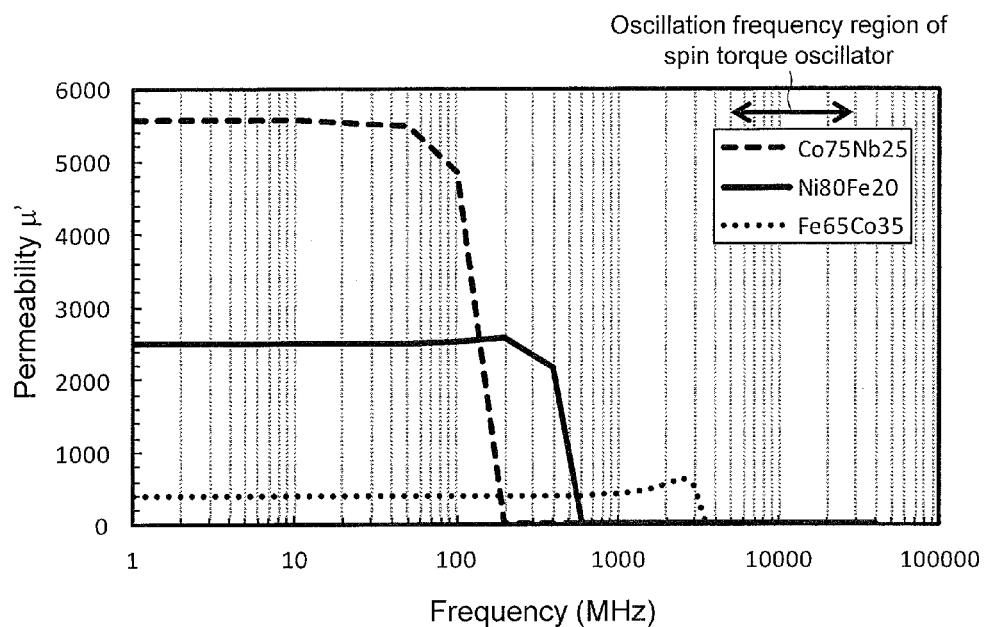
FIG. 1 is a diagram showing the frequency dependence of the permeability of soft magnetic materials.

FIG. 1 is a diagram showing the results of estimation of the frequency dependence of the permeability of $Co_{75}Nb_{25}$, $Ni_{80}Fe_{20}$, and $Fe_{65}Co_{35}$ that are typical soft magnetic materials. The permeability of $Co_{75}Nb_{25}$ becomes zero at about 200 MHz, that of $Ni_{80}Fe_{20}$ becomes zero at about 600 MHz, and that of $Fe_{65}Co_{35}$ becomes zero at about 3 GHz. Thus, no effect of absorbing a magnetic field was found to be obtained at 5 to 30 GHz that are the frequencies of a high-frequency magnetic field used for microwave assisted magnetic recording. That is, although a shield layer of a conventional soft magnetic material can suppress a spread of a recording magnetic field, it cannot suppress a spread of a high-frequency magnetic field.

A spread of a high-frequency magnetic field having an assisting function can be suppressed by using a material, which has a non-zero, finite permeability in the frequency region of the high-frequency magnetic field, for a shield layer. Thus, parameters of various magnetic materials were determined and examination was conducted using Formula (1).

Then, it was found that a hard magnetic material with a high anisotropy field has non-zero permeability in the frequency region of a high-frequency magnetic field.

Figure 2:
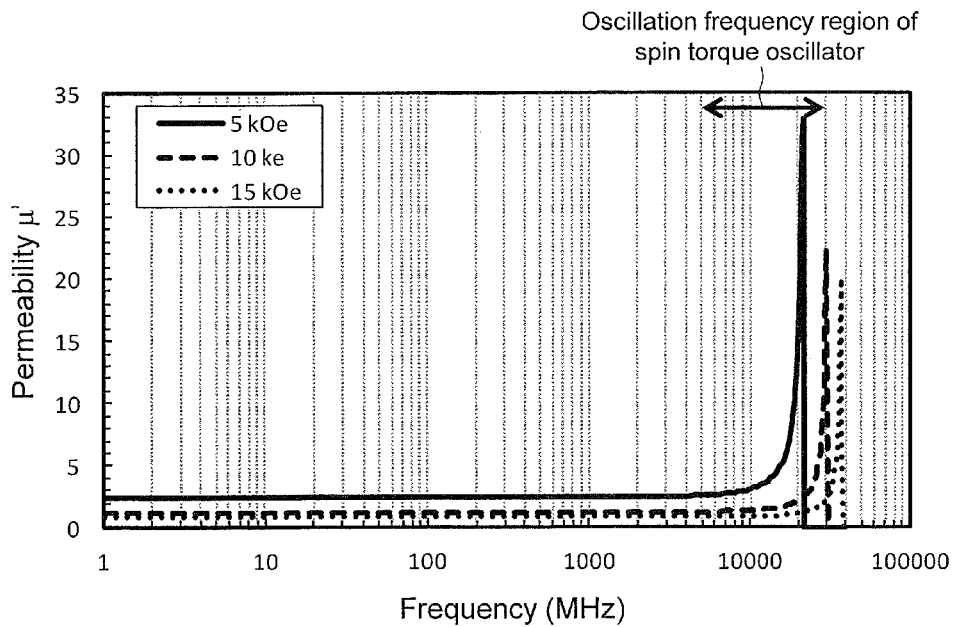
FIG. 2 is a diagram showing the frequency dependence of the permeability of hard magnetic materials.
Figure 3:
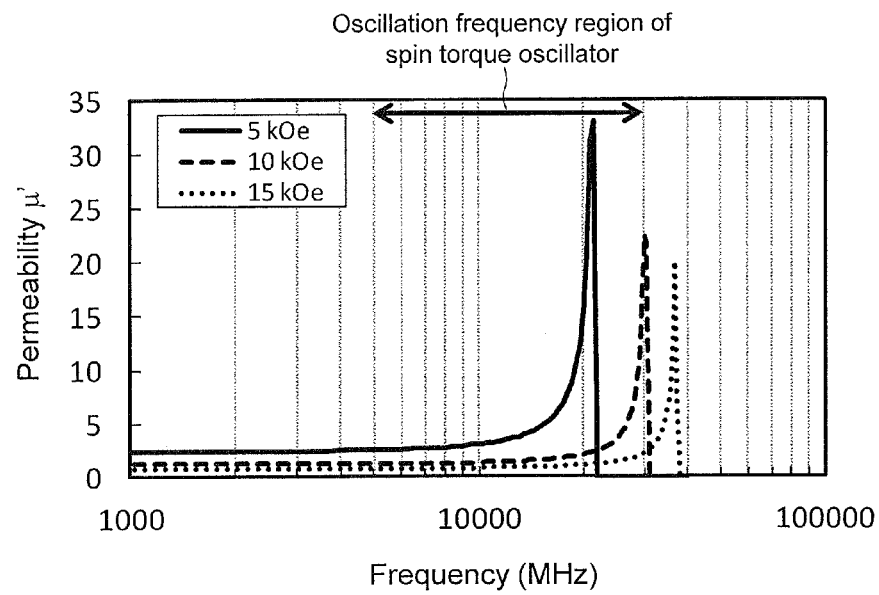
FIG. 3 is a diagram showing the frequency dependence of the permeability of hard magnetic materials in the high-frequency region.

FIG. 2 is a diagram showing the frequency dependence of the permeability of Co—Pt-based hard magnetic materials with anisotropy fields of 5 kOe, 10 kOe, and 15 kOe. In the drawing, 5 to 30 GHz, which is the oscillation frequency region of the spin torque oscillator, is also shown by an arrow. The frequency dependence has a feature such that the permeability is constant, which is less than or equal to five, at 10 GHz or less. FIG. 3 is a diagram showing the frequency dependence at 1 GHz or greater. It can be seen that the permeability is the maximum at 10 GHz or greater, and the frequency at which the permeability is the maximum is higher as the anisotropy field is higher. This means that a spread of a high-frequency magnetic field can be suppressed by adjusting the anisotropy field of a high-frequency magnetic field shield in accordance with the properties of a medium/head that perform assist recording.

Figure 4:
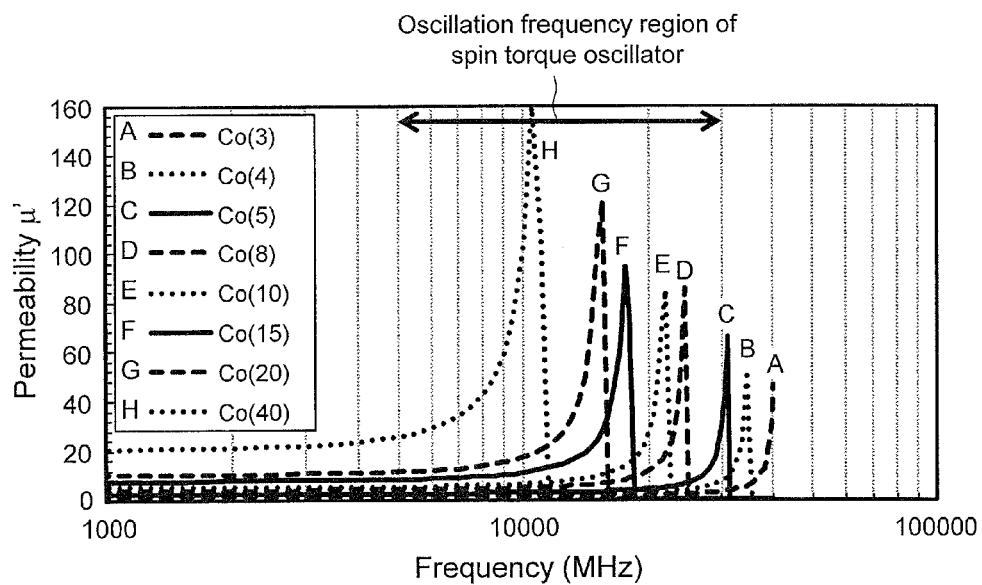
FIG. 4 is a diagram showing the frequency dependence of the permeability of Co films stacked with Ru layers interposed therebetween.

A material with a high anisotropy field can also be obtained by stacking soft magnetic films with a thin spacer interposed therebetween. FIG. 4 is a diagram showing the frequency dependence of the permeability of Co films stacked with Ru (0.4 nm), which provides a strong antiferromagnetic coupling between Co layers, interposed therebetween. The numbers shown in parentheses in FIG. 4 indicates the thickness of each Co film in units of nm. It can be seen that the thinner the thickness of the stacked Co layer, the higher the frequency at which the permeability is zero. The results herein show higher permeability as compared to that of the hard magnetic materials in FIG. 2. This is because the saturation magnetic flux densities of the magnetic films are high.

Figure 5:
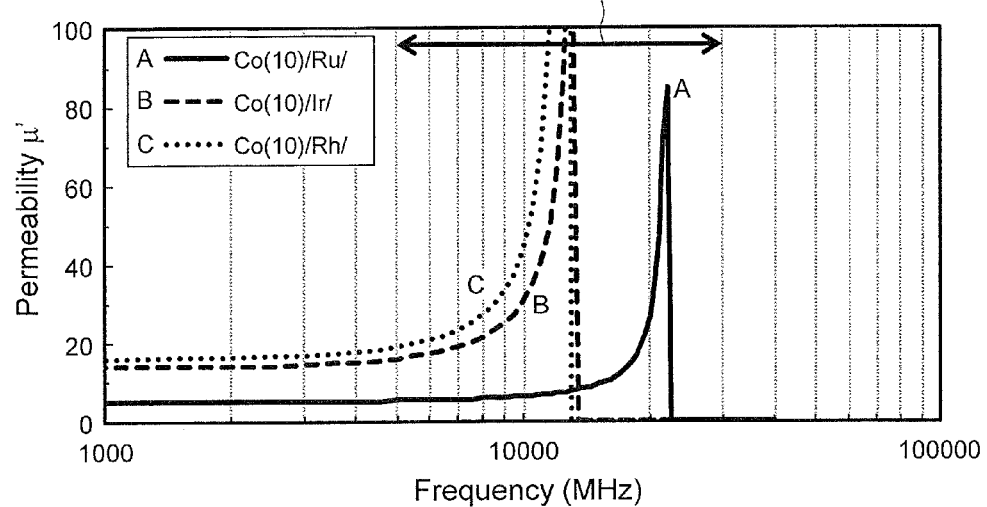
FIG. 5 is a diagram showing the frequency dependence of the permeability of Co films stacked with Ru, Ir, and Rh layers interposed therebetween, respectively.

FIG. 5 shows the frequency dependence of the permeability of a stacked Co soft magnetic film with a thickness of 10 nm when the spacer material is replaced with Ru, Ir, or Rh. It should be noted that the film thickness of the spacer material is about 0.4 nm at which the antiferromagnetic coupling is the strongest. Ru, which has the strongest antiferromagnetic coupling, has permeability at the highest frequency, but the magnitude of the permeability is small. As the antiferromagnetic coupling becomes weaker for Ir and Rh, the frequency at which the permeability becomes zero gets lower, but the absolute value of the permeability is large. Accordingly, it can be seen that selecting an appropriate material and thickness of a spacer can adjust the effect of suppressing a spread of a high-frequency magnetic field.

Next, in selecting a magnetic material to be applied to a shield layer, the behavior of the frequency dependence of the permeability for when parameters of the magnetic material are changed was investigated. As the basic parameter values, a Co film with a thickness of 10 nm and a Ru spacer with a thickness of about 0.4 nm were used.

Figure 6:
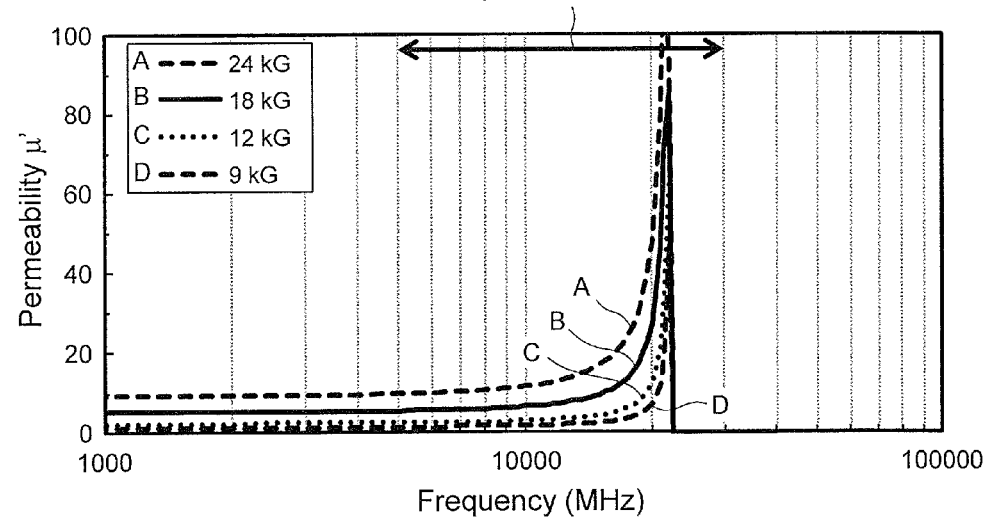
FIG. 6 is a diagram showing the frequency dependence of the permeability of magnetic films with different saturation magnetic flux densities.

FIG. 6 is a diagram showing the frequency dependence of the permeability for when the saturation magnetic flux density is increased from 18 kG, which is the value of Co, to 24 kG, or reduced to 12 kG or 9 kG. Even when the saturation magnetic flux density is changed, the behavior of the permeability with respect to the frequency does not change, and the permeability becomes zero at around 22 GHz. As the saturation magnetic flux density is higher, the value of permeability is higher in both the low frequency region and the high frequency region.

Figure 7:
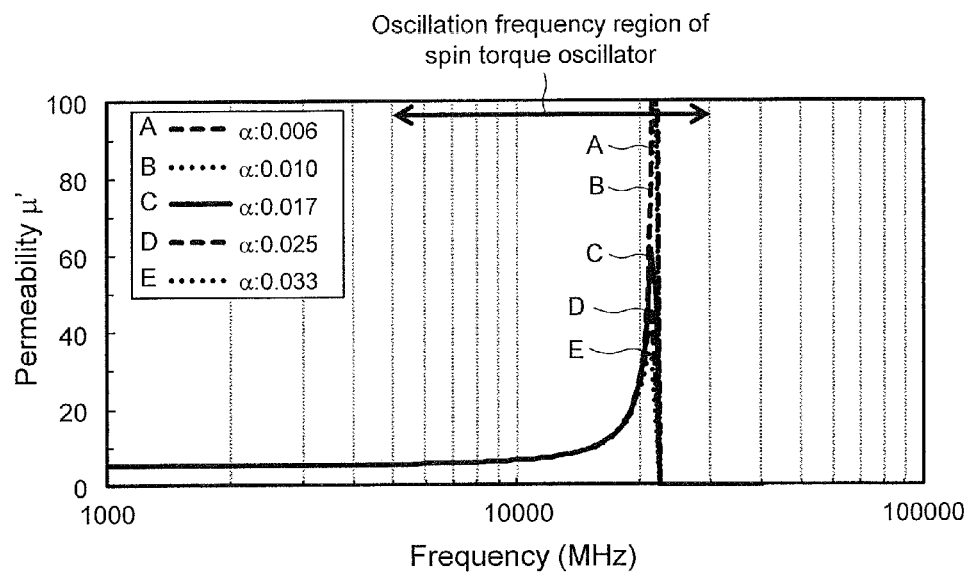
FIG. 7 is a diagram showing the frequency dependence of the permeability of magnetic films with different damping constants.

FIG. 7 is a diagram showing the frequency dependence of the permeability when the damping constant $\alpha$ is changed. It can be seen that the behavior of the permeability with respect to the frequency does not change even when $\alpha$ is changed.

When α is small, the value of permeability is high in the high frequency region, but does not change in the low frequency region. It should be noted that the value of α of the Co film is about 0.010, though it can slightly differ depending on the sample preparation method and the measuring method.

The above results can confirm that a material with high saturation magnetic flux density may be used when high permeability is needed.

Figure 8:
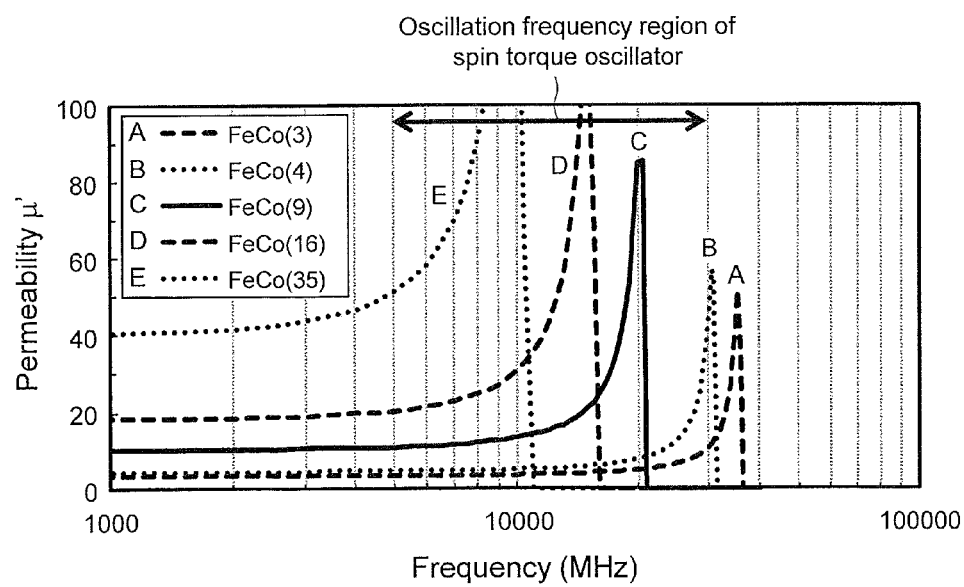
FIG. 8 is a diagram showing the frequency dependence of the permeability of FeCo films stacked with Ru layers interposed therebetween.

FIG. 8 is a diagram showing the estimated permeability of a $Fe_{70}Co_{30}$ film with saturation magnetic flux density as high as 24 kG. It should be noted that the spacer is a Ru film with a thickness of about 0.4 nm. When the thickness of the $Fe_{70}Co_{30}$ film is increased to 3 nm to 35 nm, it is possible to adjust the frequency at which the permeability becomes zero to 36 GHz to 11 GHz. Using a thicker $Fe_{70}Co_{30}$ film can obtain higher permeability, and when the thickness of the $Fe_{70}Co_{30}$ film is 35 nm, a permeability of about 40 can be obtained even in the low frequency region.

Figure 9:
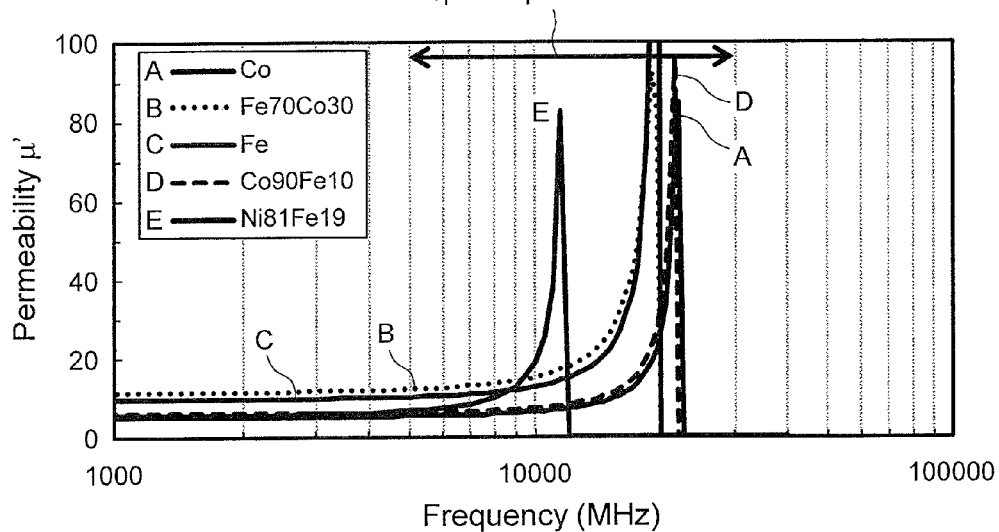
FIG. 9 is a diagram showing the frequency dependence of the permeability of various soft magnetic films interposed with Ru layers interposed therebetween.

In addition, depending on the magnetic material, the strength of exchange coupling via the spacer will also change, and based on this, the limit frequency at which the material functions as a shield and the magnitude of the permeability can be adjusted. FIG. 9 is a diagram showing the frequency dependence of the permeability for when various soft magnetic materials with a thickness of 10 nm are stacked with Ru with a thickness of about 0.4 nm, interposed therebetween. It can be seen that Co and $Co_{90}Fe_{10}$ have the highest limit frequency at which the material can function as a shield, Fe and $Fe_{70}Co_{30}$ have the second highest limit frequency, and $Ni_{81}Fe_{19}$ has the lowest limit frequency.

When the oscillation frequency of the spin torque oscillator is designed in accordance with the performances of a disk medium to be assisted, and a shield material for a high-frequency magnetic field is selected correspondingly based on the above finding, it becomes possible to adjust the degree of a spread of the high-frequency magnetic field. It should be noted that the limit frequency at which the high-frequency magnetic field shield layer functions is preferably set to be higher than the oscillation frequency of the spin torque oscillator.

The magnitude of a magnetic field generated from the main pole is higher than that of a high-frequency magnetic field, and thus the range in which the magnetic field spreads is also wider. Thus, it is considered that using a combination of a typical shield layer material and a shield layer material for a high-frequency magnetic field as the shield layer is preferable.

Hereinafter, several embodiments will be described with reference to the drawings. It should be noted that the drawings are merely intended to illustrate the features of the present invention, and the scale as well as the position and shape of each component need not be necessarily the same as those in the drawings.

[Embodiment 1]

Figure 10:
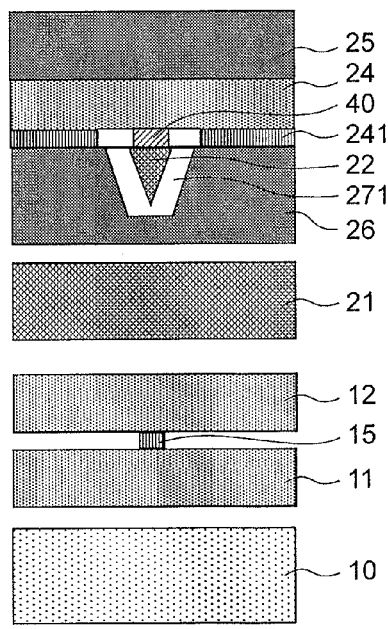
FIG. 10 is a schematic view showing an exemplary structure on an air bearing surface of a microwave assisted magnetic recording head of the present invention.
Figure 22:
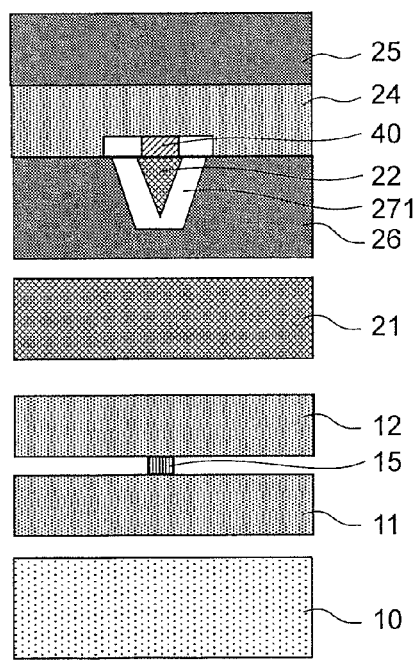
FIG. 22 is a structural view of an air bearing surface of a microwave assisted magnetic recording head with an insulator sidegap layer.

FIG. 10 is a schematic view showing an exemplary structure on an air bearing surface of a microwave assisted magnetic recording head of the present invention. The recording head of this embodiment basically has a head structure including the insulator sidegap layer 271 shown in FIG. 22, and also has a sideshield layer 241 for a high-frequency magnetic field provided between the trailing shield layer 24 and the side/leading shield layer 26. Accordingly, it is possible to control both a spread of a recording magnetic field from the main pole 22 and a spread of a high-frequency magnetic field from the spin torque oscillator 40. It should be noted that even when a high-frequency magnetic field from the spin torque oscillator 40 acts on the sideshield layer 241 for a high-frequency magnetic field, magnetization of the sideshield layer 241 for a high-frequency magnetic field does not oscillate as the volume thereof is large. Thus, this does not become a cause of adjacent track interference (ATI) or far track interference (FTI).

Herein, for the sideshield layer 241 for a high-frequency magnetic field, it is possible to use a hard magnetic material such as a Co—Pt-based alloy or an alloy obtained by adding Cr, Ta, or the like thereto; or a soft magnetic layer including Fe, Co, a Fe—Co-based alloy, a Fe—Ni-based alloy, a Fe—Co—Ni-based alloy, or the like in a single layer stacked with a spacer interposed therebetween or in multiple layers stacked with spacers interposed therebetween. For the spacer in this case, a single element such as Ru, Ir, Rh, Re, Cu, or Cr, or an alloy thereof can be used. With regard to the multilayer structure, when materials and thicknesses of soft magnetic layers and spacers are combined to form a multilayer, it is possible to form a high-frequency magnetic field shield layer with an appropriate magnitude of permeability in a wide frequency range.

Figure 11:
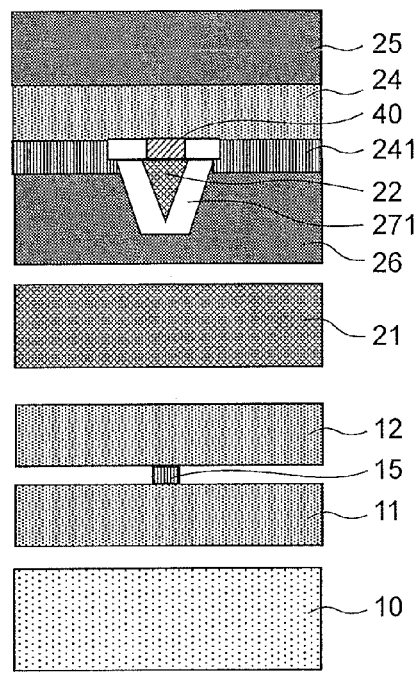
FIG. 11 is a schematic view showing an exemplary structure on an air bearing surface of a microwave assisted magnetic recording head of the present invention.
Figure 12:
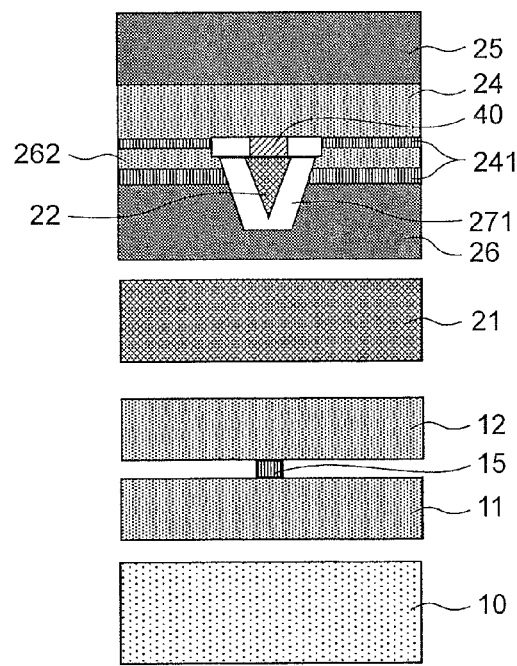
FIG. 12 is a schematic view showing an exemplary structure on an air bearing surface of a microwave assisted magnetic recording head of the present invention.

In addition, although FIG. 10 shows a structure in which the sideshield layer 241 for a high-frequency magnetic field is arranged only on both sides of the spin torque oscillator 40, the sideshield layer 241 for a high-frequency magnetic field may also be arranged on part of the both sides of the main pole 22 as shown in FIG. 11. When such a structure is employed, it is also possible to, as shown in FIG. 12, split the sideshield layer 241 for a high-frequency magnetic field into two in the down-track direction, and insert a typical sideshield layer material 262, specifically, a Fe—Co-based alloy, a Fe—Ni-based alloy, or a Fe—Co—Ni-based alloy between the split layers. Accordingly, the effect of suppressing a spread of a recording magnetic field from the main pole 22 can be increased. It should be noted that the limit frequencies at which the materials, which are split in the down-track direction, of the sideshield layer for a high-frequency magnetic field function as shields need not be identical.

Further, when the present invention is applied to shingled magnetic recording (SMR), the sideshield layer 241 for a high-frequency magnetic field need not necessarily be provided on both sides of the spin torque oscillator 40, and may be provided only on one side.

[Embodiment 2]

Figure 13:
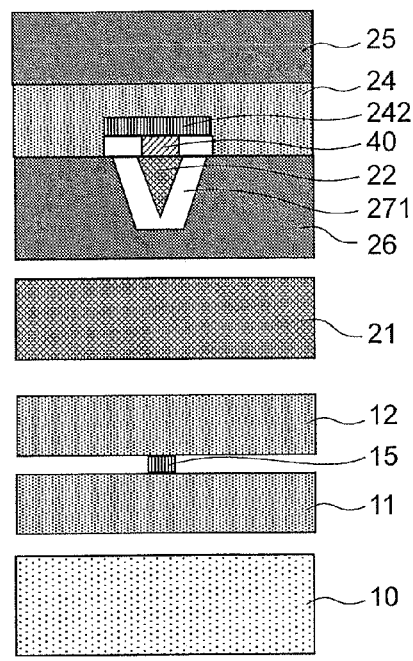
FIG. 13 is a schematic view showing an exemplary structure on an air bearing surface of a microwave assisted magnetic recording head of the present invention.

FIG. 13 is a schematic view showing another exemplary structure on an air bearing surface of a microwave assisted magnetic recording head of the present invention. In this embodiment, a trailing shield layer 242 for a high-frequency magnetic field is arranged in part of the trailing shield layer 24 such that it is in contact with the spin torque oscillator 40. Accordingly, a field gradient of a high-frequency magnetic field in the down-track direction becomes large, whereby a bit having a sharp magnetic transition can be recorded. Thus, resolution in the down-track direction can be improved.

Figure 14:
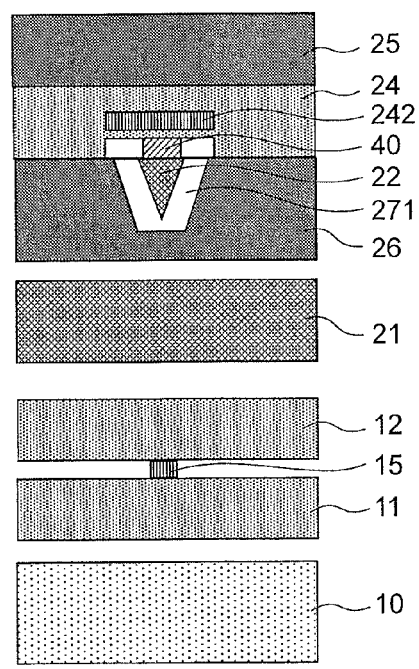
FIG. 14 is a schematic view showing an exemplary structure on an air bearing surface of a microwave assisted magnetic recording head of the present invention.

Alternatively, as shown in FIG. 14, it is also possible to provide the trailing shield layer 242 for a high-frequency magnetic field above the spin torque oscillator 40 with a material, which constitutes the trailing shield layer 24, interposed therebetween. When such a structure is employed, it is possible to increase a field gradient in the down-track direction of a recording magnetic field generated from the main pole 22. Thus, this is effective when the field gradient of a recording magnetic field should be improved more than the field gradient of a high-frequency magnetic field.

[Embodiment 3]

Figure 15:
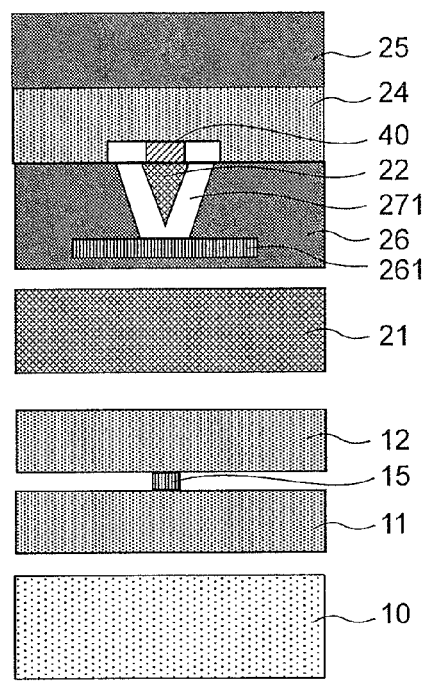
FIG. 15 is a schematic view showing an exemplary structure on an air bearing surface of a microwave assisted magnetic recording head of the present invention.

FIG. 15 is a schematic view showing another exemplary structure on an air bearing surface of a microwave assisted magnetic recording head of the present invention. In this embodiment, a leading shield layer 261 for a high-frequency magnetic field is arranged in part of the side/leading shield layer 26, at a position between the spin torque oscillator 40 and the read sensor 15.

The read sensor 15 for reading information recorded on a magnetic disk medium is provided with a longitudinal biasing layer for performing a stable read operation, and the longitudinal biasing layer is typically formed of a hard magnetic material. When a high-frequency magnetic field from the spin torque oscillator 40 reaches the longitudinal biasing layer of the read sensor 15, it is concerned that magnetization of the longitudinal biasing layer would wobble and the longitudinal biasing field would fluctuate; thus, the read operation may become unstable. This can be avoided by arranging the leading shield layer 261 for a high-frequency magnetic field between the read sensor 15, in particular, the longitudinal biasing layer and the spin torque oscillator 40.

Figure 16:
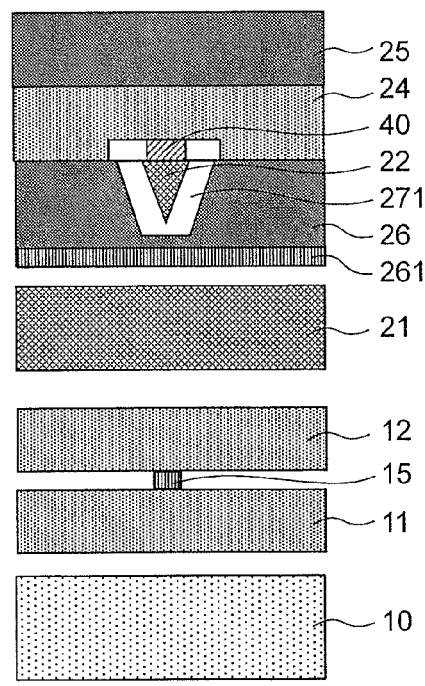
FIG. 16 is a schematic view showing an exemplary structure on an air bearing surface of a microwave assisted magnetic recording head of the present invention.

Although the leading shield layer 261 for a high-frequency magnetic field is provided below the insulator sidegap layer 271 in the example in FIG. 15, the leading shield layer 261 for a high-frequency magnetic field may be arranged at a position and with a size, which allow easy formation of the leading shield layer 261 for a high-frequency magnetic field in production of a microwave assisted magnetic recording head, as long as it is located between the spin torque oscillator 40 and the read sensor 15. For example, as shown in FIG. 16, a wide leading shield layer 261 for a high-frequency magnetic field may be formed below the side/leading shield layer 26.

In each of Embodiments 1 to 3, a high-frequency magnetic field shield layer is arranged in part of the sideshield layer, the trailing shield layer, or the leading shield layer, but may also be formed in a plurality of shield layers. In addition, although the spin torque oscillator 40 is arranged at almost the center in a track width direction between the main pole 22 and the trailing shield layer 24, the advantages of the present invention will be the same even when the spin torque oscillator 40 is not arranged above the main pole 22 or when the center of the spin torque oscillator 40 in the track width direction does not coincide with the center of the main pole 22 in the track width direction.

[Embodiment 4]

Figure 17:
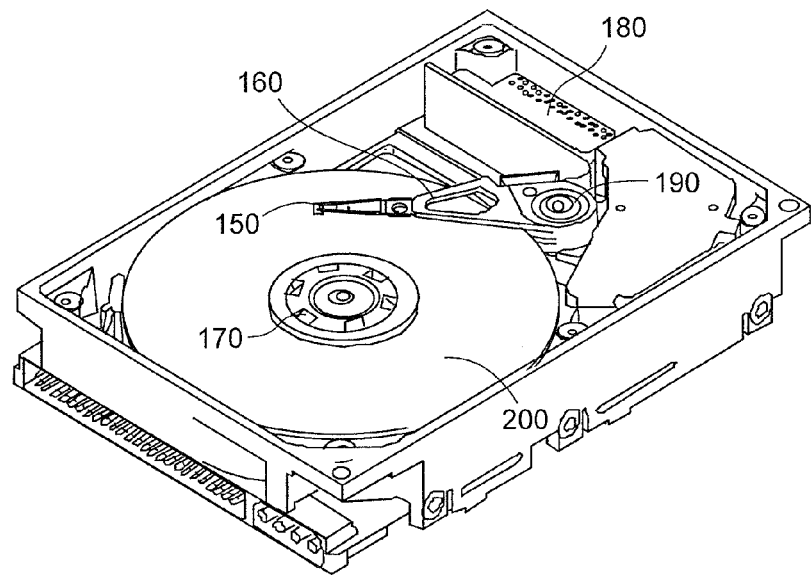
FIG. 17 is a perspective view showing the overall structure of a hard-disk drive.
Figure 18:
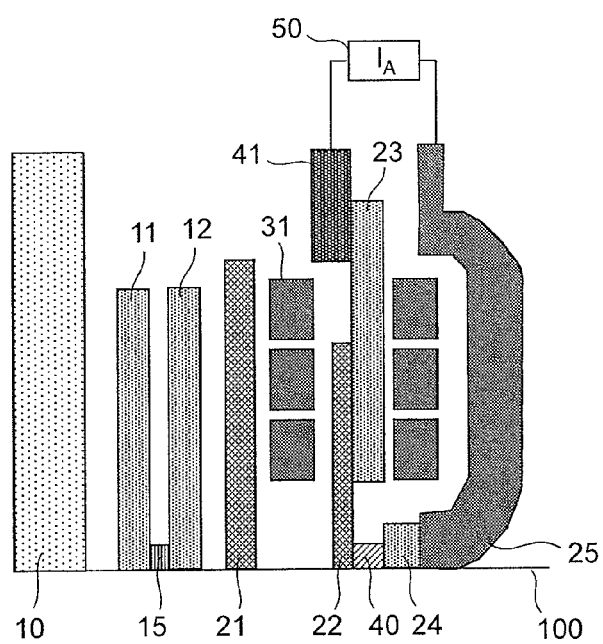
FIG. 18 is a schematic cross-sectional view of a conventional microwave assisted magnetic recording head.
Figure 19:
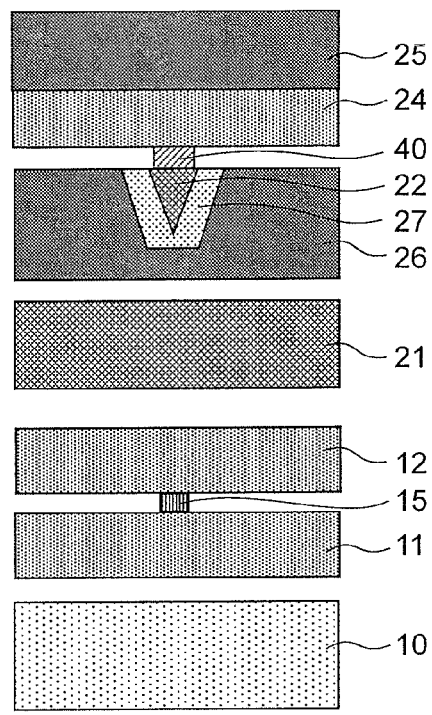
FIG. 19 is a schematic view showing the structure on an air bearing surface of a conventional microwave assisted magnetic recording head.
Figure 20:
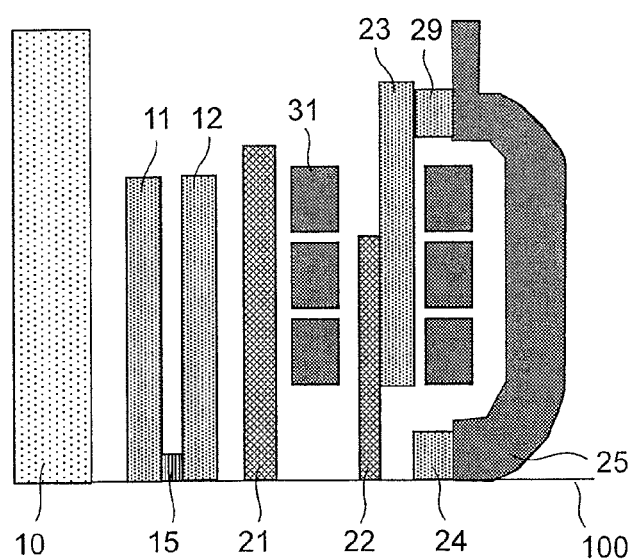
FIG. 20 is a cross-sectional view of a perpendicular magnetic recording head.
Figure 21:
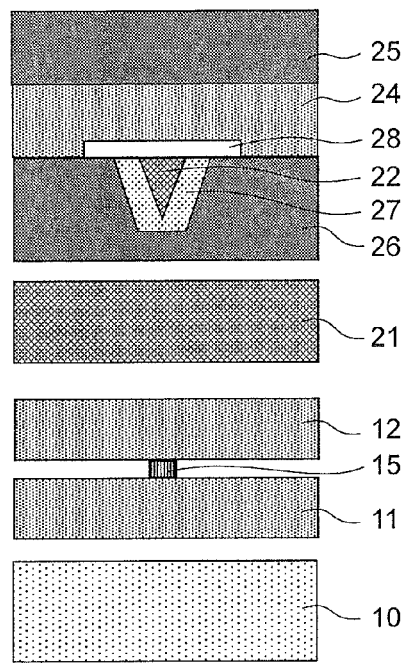
FIG. 21 is a structural view of an air bearing surface of a perpendicular magnetic recording head.

FIG. 17 is a schematic view showing a hard-disk drive having mounted thereon the microwave assisted magnetic recording head of the present invention. In FIG. 17, reference numeral 150 denotes a microwave assisted magnetic recording head, reference numeral 160 denotes an arm having the magnetic head mounted on its end, reference numeral 200 denotes a magnetic disk (magnetic disk medium), reference numeral 170 denotes a spindle motor for rotation-driving the magnetic disk, reference numeral 180 denotes a signal processing circuit for processing a magnetic recording/read signal, and reference numeral 190 denotes a voice coil motor for positioning the magnetic head above a desired track of the magnetic disk by rotation-driving the arm 160.

When the microwave assisted magnetic recording head 150 in accordance with the present invention is used, it is possible to suppress a spread of not only a recording magnetic field generated from the main pole but also a high-frequency magnetic field generated from the spin torque oscillator 40 in the track width direction or the down-track direction. Thus, higher a real density can be achieved.

It should be noted that in order to more effectively maximize the microwave assisted effect, the frequency of a high-frequency magnetic field generated from the spin torque oscillator mounted on the microwave assisted magnetic recording head 150 is preferably higher than a frequency that is determined by the effective anisotropy field of the magnetic layer that constitutes the magnetic disk 200 and furthermore responds to a high-frequency magnetic field. Herein, the limit frequency at which the high-frequency magnetic field shield layer functions is preferably higher than the frequency of a high-frequency magnetic field generated from the spin torque oscillator. When such a relationship is considered in terms of the anisotropy field, the value of the effective anisotropy field of the high-frequency magnetic field shield layer is set higher than the value of the effective anisotropy field of the magnetic layer that constitutes the magnetic disk 200 and furthermore responds to a high-frequency magnetic field It should be noted that the present invention is not limited to the aforementioned embodiments, and includes various variations. For example, although the aforementioned embodiments have been described in detail to clearly illustrate the present invention, the present invention need not include all of the structures described in the embodiments. It is possible to replace a part of a structure of an embodiment with a structure of another embodiment. In addition, it is also possible to add, to a structure of an embodiment, a structure of another embodiment. Further, it is also possible to, for a part of a structure of each embodiment, add/remove/substitute another structure.

REFERENCE SIGNS LIST

10: Substrate
11: Lower shield layer
12: Upper shield layer
15: Read sensor
21: Lower magnetic pole
22: Main pole
23: Yoke portion
24: Trailing shield layer
241: Sideshield layer for a high-frequency magnetic field
242: Trailing shield layer for a high-frequency magnetic field
25: Upper magnetic pole
26: Side/leading shield layer
261: Leading shield layer for a high-frequency magnetic field
262: Sideshield layer
27: Sidegap layer
271: Insulator sidegap layer
28: Top gap layer
29: Back contact portion
31: Coil
40: Spin torque oscillator
41: Non-magnetic lead
50: Current source
100: Air bearing surface
150: Microwave assisted magnetic recording head
160: Arm
170: Spindle motor
180: Signal processing circuit
190: Voice coil motor
200: Disk medium

What is claimed is:
1. A magnetic head comprising:
a main pole configured to generate a recording magnetic field;
a spin torque oscillator arranged around the main pole and configured to generate a high-frequency magnetic field; and
a shield layer arranged in a manner surrounding the main pole and the spin torque oscillator, wherein
the shield layer partially includes a high-frequency magnetic field shield layer, the high-frequency magnetic field shield layer including a material that absorbs the high-frequency magnetic field;

the high-frequency magnetic field shield layer includes a magnetic layer with a stacked structure of soft magnetic material layers that are stacked with a spacer interposed therebetween, and a permeability of the stacked structure becomes zero at a frequency greater than or equal to 11 GHz.

2. The magnetic head according to claim 1, wherein the soft magnetic material is one of Fe, Co, a Fe—Co-based alloy, a Fe—Ni—based alloy, or a Fe—Co—Ni—based alloy, and the spacer is one of Ru, Ir, Rh, Re, Cu, Cr, or an alloy thereof.

3. The magnetic head according to claim 1, wherein the high-frequency magnetic field shield layer is arranged on track width sides with respect to the spin torque oscillator.

4. The magnetic head according to claim 1, wherein the high-frequency magnetic field shield layer is arranged on a trailing side with respect to the spin torque oscillator.

5. The magnetic head according to claim 1, further comprising:

a read sensor for reading information recorded on a magnetic disk medium, wherein the high-frequency magnetic field shield layer is arranged between the spin torque oscillator and the read sensor.

6. The magnetic head according to claim 1, wherein a thickness of the magnetic layer with the stacked structure of soft magnetic material layers is less than or equal to 35 nm.

7. A magnetic data storage apparatus comprising:

a magnetic disk medium;

a disk driving unit configured to drive the magnetic disk medium;

a magnetic head configured to perform recording and reading operations on the magnetic disk medium; and a head driving unit configured to move the magnetic head to a desired position above the magnetic disk medium, wherein the magnetic head includes a main pole configured to generate a recording magnetic field for recording information as a magnetic signal on the magnetic disk medium, a spin torque oscillator arranged around the main pole and configured to generate a high-frequency magnetic field for enhancing a precession motion of magnetization of the magnetic disk medium, a shield layer arranged in a manner surrounding the main pole and the spin torque oscillator, and a read sensor for reading information recorded on the magnetic disk medium, the shield layer partially includes a high-frequency magnetic field shield layer including a material that absorbs the high-frequency magnetic field, the high-frequency magnetic field shield layer includes a magnetic layer with a stacked structure of soft magnetic material layers that are stacked with a spacer interposed therebetween, and a permeability of the stacked structure becomes zero at a frequency greater than or equal to 11 GHz: and an effective anisotropy field of the high-frequency magnetic field shield layer is higher than an effective anisotropy field of a layer, which responds to a high-frequency magnetic field, of the magnetic disk medium.

8. The magnetic data storage apparatus according to claim 7, wherein the high-frequency magnetic field shield layer is arranged on track width sides with respect to the spin torque oscillator.

9. The magnetic data storage apparatus according to claim 7, wherein the high-frequency magnetic field shield layer is arranged on a trailing side with respect to the spin torque oscillator.

10. The magnetic data storage apparatus according to claim 7, wherein the high-frequency magnetic field shield layer is arranged between the spin torque oscillator and the read sensor.

* * * * *